Sheet 1, 2 Sheets

J. Campbell.
Walking Planter.

No. 3,836. Reissued Feb. 15, 1870.

Witnesses;
James H. Layman,
Geo. B. Nicholson

Inventor;
James Campbell
By Munn & Bros
Attys

H. PETERS, PHOTO-LITHOGRAPHER, WASHINGTON, D. C.

Sheet 2, 2 Sheets

J. Campbell.
Walking Planter.

No. 3,836. Reissued Feb. 15, 1870.

Witnesses;
Wm. H. Burton Jr
Jas. C. Linn

Inventors;
James & William Campbell
by Knight Bros
attorneys

N. PETERS, PHOTO-LITHOGRAPHER, WASHINGTON, D. C.

UNITED STATES PATENT OFFICE.

JAMES CAMPBELL AND WILLIAM CAMPBELL, OF HARRISON, OHIO, ASSIGNEES OF JAMES CAMPBELL.

IMPROVEMENT IN CORN-PLANTERS.

Specification forming part of Letters Patent No. 54,642, dated May 8, 1866; Reissue No. 3,836, dated February 15, 1870.

*To all whom it may concern:*

Be it known that JAMES CAMPBELL, of Harrison, Hamilton county, Ohio, did invent a new and useful Corn-Planter; and we do hereby declare the following to be a full, clear, and exact description thereof, reference being had to the accompanying drawings, making part of this specification.

This invention relates to the class of grain-planting apparatus adapted to be drawn forward by horse or other animal-power, and whose seed or grain is deposited automatically by motion derived from a ground-wheel; and the invention consists, chiefly, in devices for insuring the uniform and effective delivery of the grain, and for the ready increase, decrease, or suspension of the dropping operation.

Figure 1:
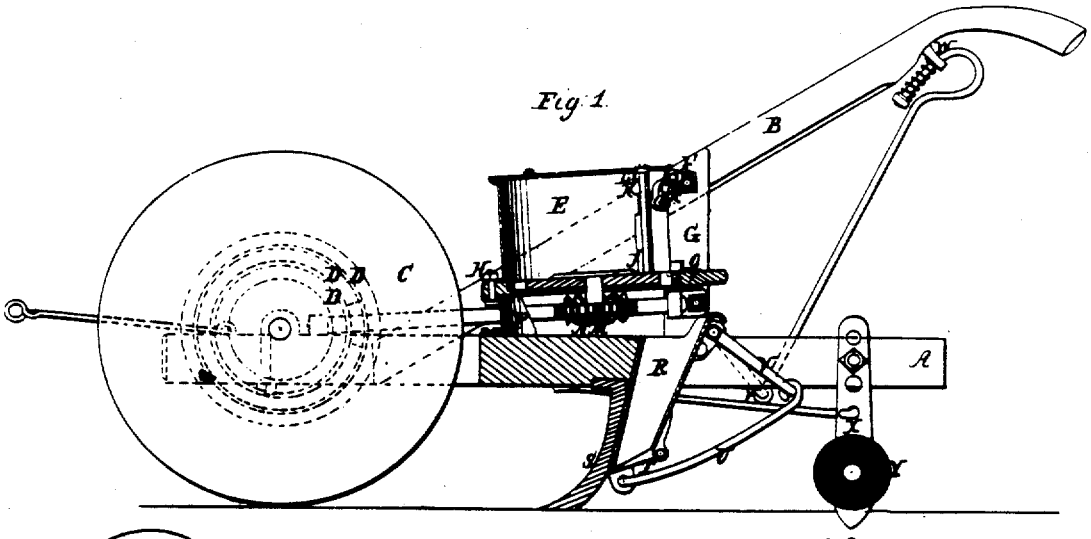
Figure 2:
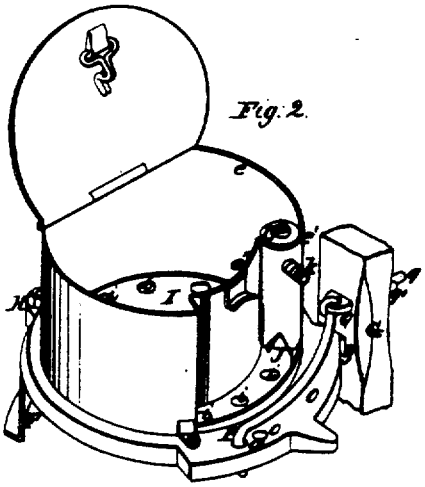
Figure 3:
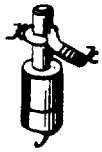
Figure 4:
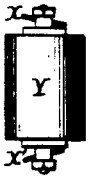
Figure 5:
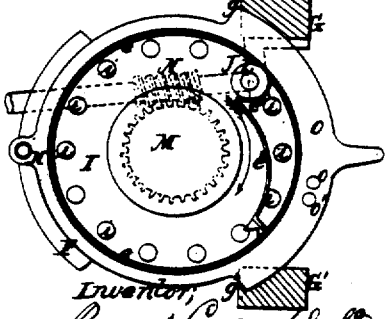
Figure 6:
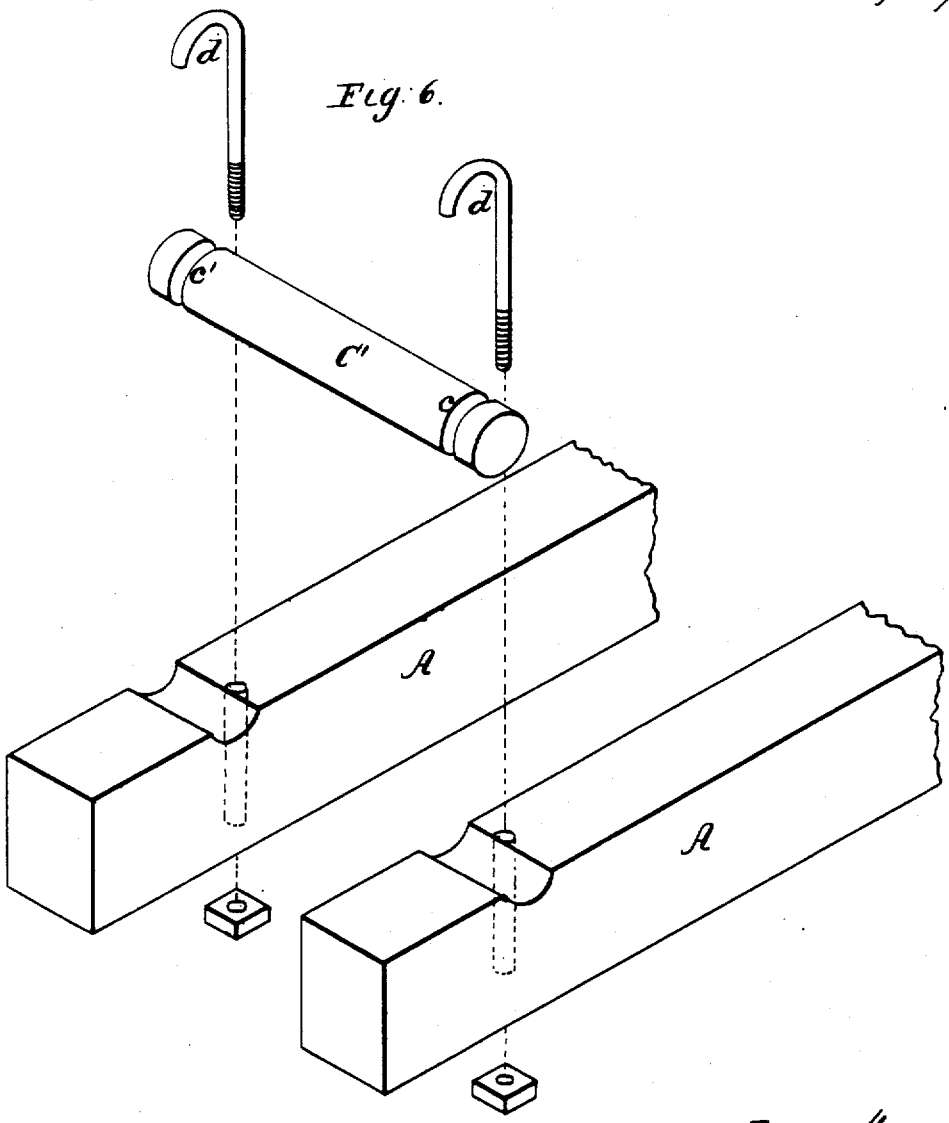

Figure 1 is a partially-sectionized side view of a machine embodying the improvements. Fig. 2 is a perspective view of the grain-box. Fig. 3 shows the cut-off brush detached. Fig. 4 is a top view of the covering-roller. Fig. 5 is a horizontal section through the grain-box. Fig. 6 is a perspective view, showing the grooved axle of the ground-wheel, with its connecting-staples and a portion of the frame, the illustration being drawn in a somewhat enlarged scale and the parts detached.

A represents the right-hand beam, and B the right-hand handle, of a customary double-beamed planter-frame.

Journaled to the front part of the frame A is a ground-wheel, C, having a series of concentric bevel-wheels. (See dotted lines D.)

The axle C′ of the ground-wheel C has two circumferential grooves, *c c′*, to receive hooks or staples, (see Fig. 6, and dotted lines *d*, Fig. 1,) so as to both hold the drive-wheel in gear with its pinion and to prevent the spreading of the beams.

The grain-box E is pivoted in front to a curved plate, F, and its back is supported in two notches, *g g′*, in as many posts, G G′.

The curved plate F, besides supporting the front end of the grain-box, is connected to it by a pivot-bolt, H, so as to permit the box to be slightly shifted to the right or left, for a purpose presently explained. The notches *g g′* are also so formed as, while supporting the rear portion of the grain-box, to admit of the shifting operation. The curved plate F likewise serves the purpose of a fender to intercept and divert to either side all trash and dirt that would otherwise pass underneath the grain-box and clog the gearing and grain-passages.

The grain-box E is composed of an annular plate, O, which supports a body consisting of a number of cylindrical segments, *e e′ e″*, of which the portion *e* is concentric with a circular plate or disk, I, pierced at equal distances around its circuit with grain-measuring apertures *i*, each capable of receiving a single grain or the desired modicum of corn or other grain. The portion *e′* forms a semicircular recess for the reception of a common round brush, J, such as is used by painters. The brush J is held in position by means of a hook, K, having a screw-shank, *k*, and nut *k′*, and by a head, L, which fits and occupies the upper part of the recess *e′*. This arrangement permits the use of the cheap and easily-renewed common circular brush, which brush, when worn or bent to one side, can be restored to efficiency by slackening the nut *k′* and partially rotating the brush, so as to present a new and unworn set of bristles to the action of the grain.

The portion *e″* of the box is arranged so much nearer the center of the latter as to expose a number of apertures, *i*, to the view of the operator. The portion *e″* trends somewhat away from the center of the box, so as to permit an easy circulation of the grain in the direction of the arrow, and to prevent the crowding of kernels under the edge of the box.

The disk or revolving grain-measure I is furnished underneath with a worm-pinion, M, actuated by a worm-wheel, N, driven from the ground-wheel.

The annular plate O has two or more perforations, *o o′*, to receive a hook, P, linked to an eye, Q, which eye has a screw-shank, *q*, and nut *q′*, by which it can be adjusted forward or backward, so that when the hook P is engaged in the perforation *o′* of the worm-gearing M N the worm-gearing can be adjusted accurately in mesh by means of the nut *q′*. When, on the other hand, it is desired to disconnect the seed-delivery mechanism, the hook P is withdrawn from the perforation *o′*, and the box E being shifted to the left, the hook P is inserted in the perforation *o*, so as to hold the worm movement out of gear.

The hook P being linked to the same post G, to which is attached the rear journal-box, *n*, of the worm-shaft N′, the worm N and its pinion M are held securely in gear, and are not liable to be spread apart by an accidental crowding of large grains, as would occur were the said hook and journal-bearing connected to different parts of the frame.

The rotation of the seed-measure causes a single grain at a time (or desired modicum of grains) to drop at regular intervals into a spout, R, arranged immediately behind a drill-tooth, S. The lower end of the spout slopes obliquely upward from the rear of the drill-tooth, and is, when the implement is used for planting in "hills," closed by a valve, T, connected by rods U and arms V with a spring-trigger, W.

X X are two covering-shares, which are perforated to receive a roller, Y, which roller is applied when the implement is used for planting in sod.

The arrangement and position of the drill-tooth and dropping-spout are such as to protect the latter from interference by clods or trash, the upward and rearward inclination of the valve T enabling trash to easily escape it, and also enabling the grain to be liberated near the ground by a slight motion of the valve and without striking it against the ground.

The flare and obliquity of the dropping-spout upward and rearward and its distance below the drop-plate are such as to afford the husbandman an uninterrupted view of the descending grain on its way from the dropping-plate to the ground, so that should the spout or other portion of the grain-passages become clogged the defect can be forthwith observed and remedied.

The provision for adjusting the worm-gear accurately to mesh enables the machine to be operated with more certainty and less labor than is usual with planters of this class.

The short jog at the junction of the parts *e* and *e″* is not essential to the invention.

We claim herein as new and the invention of JAMES CAMPBELL aforesaid—

1. A grain-box, whose front portion is supported and pivoted upon a curved fender-plate, F, and whose rear portion is supported in notched posts G *g* G′ *g′*, or their equivalent, substantially as described.

2. The grain-box E *o o′*, having the pivoted front and perforated rear portion, in the described combination with the hook P Q *q q′*, for the purposes set forth.

3. In a grain-box, E, provided with a revolving grain-measuring floor or disk, I *i*, and a gated indentation, *e′*, the oblique section or portion *e″* of the wall, extending from the said indentation *e′* in a line eccentric to the disk I, and trending away from the center thereof, for the purpose set forth.

4. The cut-off brush J, when secured by the head L and clamps K *k k′* in the manner represented, to adapt it to be raised, lowered, or rotated, as required, to insure its efficient action and uniform wear.

5. The combination, with the driving-wheel C, of the circumferentially-grooved axle C′ *c c′*, and staples *d d*, substantially as and for the purpose set forth.

6. The arrangement of hook P, revolving grain-measure I, pinion M, worm-shaft N, worm-shaft journal-box *n*, and post G, substantially as set forth.

7. The arrangement in the rear of the drill-tooth S and some distance below the drop-plate of the upwardly and rearwardly flaring dropping-spout R, as and for the purposes designated.

In testimony of which invention we hereunto set our hands.

JAMES CAMPBELL.
WILLIAM CAMPBELL.

Witnesses:
GEO. H. KNIGHT,
JAMES A. CAMPBELL.